S. C. CARY & H. H. BRAND.
METHOD OF MAKING SAW TOOTH FASTENERS.
APPLICATION FILED APR. 5, 1915.
1,210,417. Patented Jan. 2, 1917.
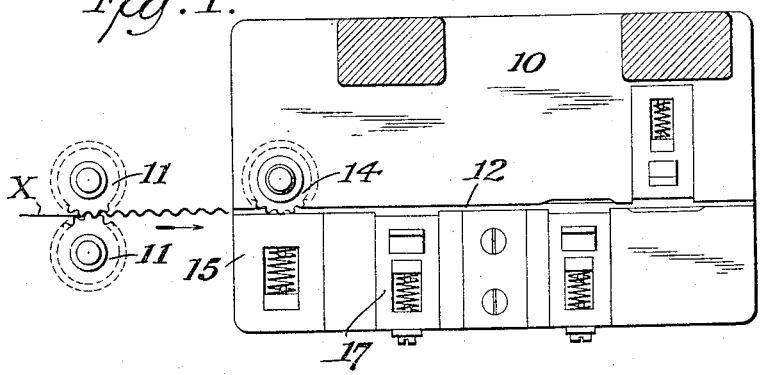
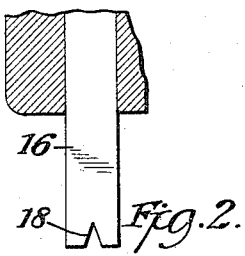
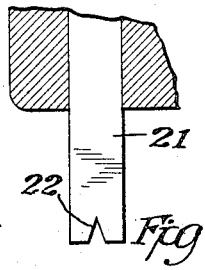
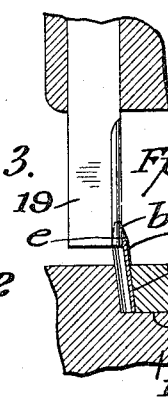
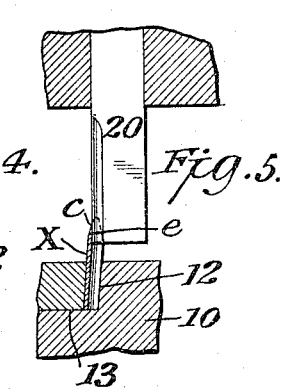
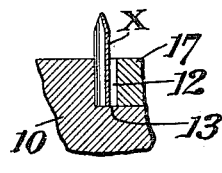
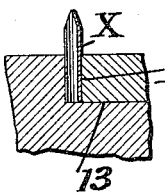
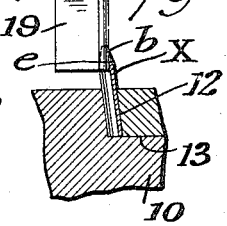
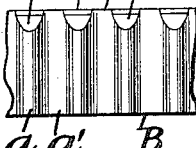
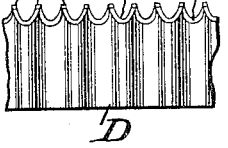
Witness
A. R. Appleman.
Inventor,
Spencer C. Cary and
Herman H. Brand.
By their Attorneys
Edson Bernhard

UNITED STATES PATENT OFFICE.

SPENCER C. CARY AND HERMAN H. BRAND, OF BROOKLYN, NEW YORK, ASSIGNORS TO CARY MANUFACTURING CO., OF BROOKLYN, NEW YORK, A CORPORATION OF NEW YORK.

METHOD OF MAKING SAW-TOOTH FASTENERS.

1,210,417. Specification of Letters Patent. Patented Jan. 2, 1917.

Original applications filed December 31, 1913, Serial No. 809,617, and October 8, 1914, Serial No. 865,678. Divided and this application filed April 5, 1915. Serial No. 19,377.

*To all whom it may concern:*

Be it known that we, SPENCER C. CARY and HERMAN H. BRAND, both citizens of the United States, residing at the city of New York, borough of Brooklyn, county of Kings, and State of New York, have invented a certain new and useful Method of Making Saw-Tooth Fasteners, of which the following is a specification.

The invention of this application constitutes a division of prior applications filed by us on machines for producing corrugated fasteners dated December 31, 1913, Serial No. 809617, and for corrugated fastener machine, dated October 8, 1914, Serial No. 865678, wherein we have disclosed certain novel modes of procedure whereby corrugated metal stock is subjected to treatment without grinding the metal so as to result in sharpened saw teeth, the opposite faces of the corrugated fastener being beveled, and the points of the teeth being positioned accurately in the plane of the medial line of the fastener.

According to our invention, a length of flat smooth metal stock of the required width, gage and temper is first corrugated by bending and rebending the same to produce corrugations which extend alternately on each side of the medial line of said stock. Said corrugation stock is now fed or moved in the direction of its length, one edge portion of the stock resting in contact with a suitable bed to resist the action of tooth forming mechanism upon that edge of the upstanding stock which is free from contact with said bed. Said tooth forming mechanism may be in the form of rotary milling cutters and of clearing dies as disclosed in application Serial No. 809617, whereby metal is removed from the corrugated stock to form bevels upon the respective faces of said stock, the edges of the resulting teeth and the throats between such teeth being cleared from burs or roughnesses by the operation of said clearing dies. We prefer, however, to swage the metal at one edge of the corrugated stock for the purpose of compressing the metal so as to produce embryonic teeth, such swaging or compression of the metal resulting in bevels which converge toward the medial line of the fastener, the metal thus compressed, or swaged producing fillets alternating with each other on the opposite faces of the stock, and thereafter said stock is subjected to the action of clearing dies which at a single operation cut out the fillets and result in the formation of saw teeth the edges of which are free from burs so as to be smooth and sharp.

At a certain stage in the formation of the teeth upon one edge of the corrugated stock by the action on said stock of mechanism of one form or another as disclosed in the aforesaid applications, the teeth are sharpened and positioned accurately in the plane of the medial line of the fastener. This function results from the operation upon the points of the teeth of a die or dies the working faces of which are at a sharper angle than the angle of inclination of the bevels on the saw teeth of the corrugated stock, whereby the points of the teeth are swaged or compressed subsequently to the formation of said teeth.

Other features and advantages of our invention will appear from the following detailed description taken in connection with the drawings.

In the drawings, Figure 1 is a plan view of so much of a corrugated fastener machine as is necessary to an understanding of our invention. Fig. 2 is a sectional elevation of a swaging die showing the metal stock in a compressed condition after the action of the swaging die thereon. Fig. 3 is a sectional elevation of a tooth pointing die for centralizing the points of the teeth in the plane of the medial line of the resulting corrugated fastener. Figs. 4 and 5 are sectional elevations of the clearing dies employed for removing the metal fillets resulting from the compression or swaging of the corrugated metal stock. Fig. 6 is an elevation of the metal in the several stages of making the corrugated fastener. Fig. 7 is a plan view, on an enlarged scale, of the corrugated metal subsequent to the action of the swaging die to produce the reversed bevels upon the convex bends at the respective surfaces of the metal but prior to the action of the clearing dies or of the pointing die. Fig. 8 is an enlarged plan view of the completed fastener showing the saw teeth and the bevels on that edge of the fastener below the points of the teeth and particularly the bevels on the concave bends of the fastener.

Referring now to the drawings, 10 designates the bed of a corrugated fastener machine suitable for treating the metal stock X in accordance with the procedure of our invention and to produce the novel fastener shown at D in Fig. 6. The stock X is a continuous metal strip of the required width, gage and temper to answer the purposes, it being required that the temper and gage shall be substantially uniform in order that the metal may be worked to the best advantage in producing a fastener the teeth of which are uniform and which may be driven without bending into the wood or other material.

The metal stock passes to and between the coöperating corrugating rolls, 11, the same being power driven and operating upon the stock to impart corrugations thereto, i. e., to continuously bend and rebend the metal so as to form corrugations extending alternately on each side of the central or medial line of the resulting fastener.

The machine bed 10 is provided with a longitudinal guideway 12 through which the corrugated stock is advanced lengthwise, said stock resting firmly at the bottom edge thereof upon the solid wall 13 at the bottom of the guideway. As the stock enters the guideway it is engaged by a corrugated feed roll 14 which coöperates with a spring-actuated guide block 15.

The teeth are formed upon the free edge of the upstanding length of corrugated stock, for which purpose we may employ the rotary milling cutters and clearing dies of our prior application Serial No 809,617, or the swaging dies and clearing dies disclosed in application Serial No 865,678. For the purposes of illustration, however, we have elected to show the swaging dies and the clearing dies of the later application, but it will be understood that either form of mechanism may be employed for producing the bevels upon the respective faces of the corrugated stock, which bevels are produced upon the concave and convex surfaces of the corrugations and at the bases or throats of the teeth, and said bevels on the respective surfaces converging so that the points of the teeth are centrally positioned i. e., said points are in the plane of the medial line of the resulting fastener.

The corrugated stock is acted upon by the swaging die 16, shown in Fig. 2, and at this time said stock is held firmly in the guideway 12 by a clamping member 17, the latter being slidable on the bed 10 relatively to the guideway 12. Said swaging die 16 is positioned over the guideway and it is reciprocable relatively to the corrugated stock. As shown, said swaging die is provided within the lower end thereof with a V shaped recess 18, the angle of inclination of the walls of said recess corresponding to the angles of the bevels to be produced upon the edge portion of the corrugated stock. With the metal stock clamped rigidly in position within the guideway, the die 16 descends upon and into contact with said stock for the purpose of imparting the required bevels to the stock, said die swaging or compressing the metal as shown at A in Fig. 6, wherein the metal is bent and rebent at $a$ $a'$ respectively so as to produce convex surfaces at $a$ and concave surfaces at $a'$. As a result of the swaging operation by the die 16, the corrugated metal, at the driving edge of the resulting fastener, is formed with reversed bevels $b$ $c$ on the respective surfaces of said metal, the bevels $b$ being produced upon the convex bends $a$ viewing the metal in a certain position and looking at one surface thereof, whereas the bevels $c$ are produced upon similar convex bends viewing the metal in the same position and looking at the other surface thereof. Said bevels $b$ are thus provided on the adjacent convex bends at one surface of the corrugated metal, while on the other surface of the corrugated metal the bevels $c$ are on the convex bends thereof, as shown in Fig. 7; thus the bevels $b$ on one surface of the metal are in alternate order to the bevels $c$ on the other surface of the metal, said bevels $b$ $c$ converging upwardly so that the apices meet in a substantially straight line at $d$ lying in the plane of the medial line of the fastener. At this stage in the manipulation of the stock when swaging the upper edge thereof no metal is removed from the stock, but as will appear by reference to the stock shown at A in Fig. 6 the metal of the corrugated stock is compressed so as to produce the bevels $b$ $c$ which constitute fillets of metal in the throats or spaces of the embryonic teeth, which fillets of metal must be removed by cutting out the metal on definite lines in order to produce the sharply defined saw teeth on one edge of the fastener. This cutting out operation, e. g., the removal of the metal fillet on definite lines is effected by the clearing dies 19, 20 shown in Figs. 4 and 5, the two dies acting respectively upon the metal fillets present upon the opposite surfaces of the corrugated stock. The die 19 operates to cut out the fillets on one surface of the stock: as shown, the die is reciprocated in a rectilinear path and the stock is presented in a position inclined in one direction to the path of the die. The other die 20 reciprocates in a rectilinear path and operates upon the metal fillets present on the other surface of the stock, the latter being inclined to the path of the said die 20 and being oppositely inclined to the position assumed by the stock when the die 19 acts thereon. The position of the stock inclined to the path of the respective dies 19, 20, is determined by the guideway 12, said stock being changed from one inclined position to the reversed inclined position after the die 19 operates on the fillets present on one surface of the stock and prior to the action of die 20 upon the fillets present on the opposite surface of the stock.

The stock is fed intermittently through the guideway, and when at rest the dies operate thereon. The dies 19, 20, cut out the metal constituting the fillets, the lines of such cuts being in definite relation to the edges of the bevels $b$ $c$ for producing the sharply defined saw teeth, and simultaneously with the removal of the metal from the bevels on the convex surfaces of the bends said dies act upon the concave surfaces of the bends to produce bevels $e$ thereon, as a result of which each bend $a$ or $a'$ is provided on the convex surface with a bevel $b$ or $c$ and on the concave surface with a bevel $e$, said beveled surfaces $b$ or $c$ being at the bases of the teeth. It will be understood that the stock is first bent at $a$ and rebent at $a'$ to produce the corrugations, and thereafter that one edge of the stock is swaged to produce the alternate bevels $b$ $c$ on the reversed bends. The stock is moved intermittently, and it is presented successively into the path of dies 19 and 20. The die 19 is formed with a corrugated face and edge conforming to the corrugated metal, and as shown the metal is presented in an inclined position to the path of the reciprocating die, so that said die acts upon the swaged edge at one surface of the metal to cut the fillets $b$ on predetermined lines and simultaneously therewith to shear the edge in the concave surfaces of the bends $a'$, as a result of which the die 19 leaves sufficient metal in the convex bends $a$ to produce the embryonic saw teeth and to form bevels $e$ in the concave surfaces of the intermediate bends $a'$. The other die 20 is similarly formed with a corrugated face and edge and the metal stock is presented in a reversely inclined position, see Fig. 5, to the reciprocating die 20, so that said die 20 operates on the metal at the other surface thereof so as to complete the formation of the teeth by removing the fillets $c$ on said opposite surface of the corrugated stock, said die 20 cutting the metal out of fillets or bevels $c$ on predetermined lines to complete the teeth and to shear the concave surfaces of the bends $a'$, so as to produce bevels $e$ on said concave surfaces. It is apparent that the successive action of the dies 19, 20, removes metal along well defined lines from the swaged edge of the stock for the purpose of forming the saw teeth and of beveling the concave surfaces of said stock. These bevels are on the concave and convex surfaces of the reversely bent portions $a$ $a'$ of the corrugated stock, and they result in draw cutting edges below the points of the teeth so that in using the resulting fastener said teeth will easily penetrate the wood, when driven either with or across the grain, and without cracking or splitting the wood. Either before or after removing the metal fillets, the edge portion of the corrugated metal is swaged for the purpose of centralizing the points of the teeth in the plane of the medial line of the fastener and for the additional purpose of producing sharp points on said teeth.

The mechanism shown in Fig. 3 for performing this function is a pointing die 21, adapted to operate upon the edge of the corrugated stock subsequently to the swaging of said stock by the swaging die 16 and prior to the action thereon of the fillet removing dies 19 and 20. The pointing die 21 is reciprocable toward and from the stock, said die being movable in a rectilinear path and adapted to operate upon the swaged edge, $d$, of the stock when the latter is held firmly in a position of rest. The pointing die is provided in its lower end with a recess 22, the walls of which converge upwardly. The angle of inclination of the walls forming said recess is less than the angle of inclination of the walls in the recess 18 of the swaging die 16, and, hence, is less than the angle of the bevels $b$, $c$, given to the stock by said swaging die. Said pointing die is movable to a position for engagement with the substantially straight edge, $d$, of the swaged stock, and said die operates upon said edge of the stock to impart thereto sharpened points $f$ on the saw teeth, the metal stock being now in the condition shown at B in Fig. 6. The die 21 thus performs the important functions of accurately positioning the points in the exact center or in the plane of the medial line of the fastener, and for sharpening the points of the teeth.

According to our invention the plain metal stock is first corrugated, the metal on one edge of the corrugated stock is cut away so as to form the saw teeth and also to produce bevels at the bases of said teeth and upon the concave and convex surfaces of the corrugated stock, and the points of the teeth are centrally positioned and sharpened. In the preferred mode of procedure, the corrugated stock is first swaged, resulting in beveled fillets, then the compressed edge is further swaged to centrally position said edge, and finally the clearing dies cut out the fillets for producing the well defined teeth and simultaneously therewith to form the bevels upon the convex surfaces of the corrugations at the bases of the teeth, thus resulting in draw cutting edges below the accurately centered points of the teeth.

The operations of beveling the edge portion of the stock are performed without grinding the metal, thus overcoming the objection of unduly heating the metal and drawing the temper thereof. Furthermore, the beveling operations are performed at two distinct stages, first, by swaging the edge of the corrugated stock so as to result in the bevels or fillets *b*, *c*, thus also preliminarily positioning the points of the embryonic teeth centrally with respect to the fastener, and, second, when cutting out the fillets the clearing dies act to impart the bevels to the convex surfaces of the bends composing the corrugations. In short, the swaging operation by die 16 imparts the required bevels *b*, *c*, to the convex surfaces of the reversed bends, and the fillet-removing operations of the dies 19, 20, give to the concave surfaces of the reversed bends the bevels *e*, such bevels being positioned at the bases of the teeth.

The article disclosed herein constitutes the subject matter of a divisional application filed by us on July 2, 1915, Serial No. 37682.

Having thus fully described our invention what we claim as new and desire to secure by Letters Patent is:—

1. The improvement in the art of making saw tooth corrugated fasteners which consists in bending metal stock to impart corrugations thereto, swaging one edge of the corrugated stock for simultaneously producing reversed bevels upon the surfaces of the stock, removing the metal on definite lines from the swaged beveled edges of the stock and producing well defined saw teeth in said edge of the stock, and additionally swaging the edge of the stock for positioning said edge and the points of the resulting teeth in the plane of the medial line of the fastener to be produced.

2. The improvement in the art of making saw tooth corrugated fasteners which consists in compressing one edge portion of a corrugated length of metal stock by subjecting said edge to lateral pressure simultaneously applied to the respective surfaces of the corrugated stock, and subsequently cutting out the metal at the previously compressed edge of the corrugated stock to produce well defined saw teeth in said edge.

3. In the art of making saw tooth corrugated fasteners, that improvement which consists in successively cutting the edge portion of a length of corrugated metal stock in two directions each inclined to the medial line of the corrugated stock for producing well defined teeth on said stock, and in swaging the points of the teeth whereby the swaged points of the teeth are positioned in the plane of the medial line of the resulting fastener.

4. In the art of making saw tooth corrugated fasteners, that improvement which consists in successively cutting the edge portion of a length of corrugated metal stock in two directions each inclined to the medial line of the corrugated stock for producing well defined teeth on said stock, and swaging the points of said teeth to sharpen the same and centralize them in the plane of the medial line of the fastener.

5. In the art of making saw tooth corrugated fasteners, that improvement which consists in swaging the edge portion of a length of corrugated metal stock for producing opposite bevels on the respective concave and convex surfaces of the corrugated stock, and subsequently cutting out metal from the swaged edge of said corrugated stock on lines inclined to the corrugated stock.

6. In the art of making saw tooth corrugated fasteners, that improvement which consists in compressing the edge portion of a length of corrugated metal stock for producing on the respective surfaces of the stock bevels which are inclined oppositely to each other and diagonal to the medial line of the corrugated stock, and subsequently cutting out metal fillets from the bevels so compressed, the lines of direction of the successive cuts being diagonal to the medial line of the corrugated stock.

7. In the art of making saw tooth corrugated fasteners, the improvement which consists in cutting an edge portion of corrugated metal to produce saw teeth upon said edge, and subsequently to the cutting operation swaging the points of the saw teeth for the purposes of sharpening said points and of positioning said points in the plane of the medial line of the corrugated metal.

8. In the art of making saw tooth corrugated fasteners, the improvement which consists in forming bevels upon the convex surfaces and at the respective sides of the corrugated metal, which bevels converge toward the edge of said metal, and cutting the corrugated metal to produce bevels upon said edge and in the concave surfaces of said corrugated metal.

In testimony whereof we have signed our names to this specification.

SPENCER C. CARY,
HERMAN H. BRAND.

Witnesses:
W. GERBER,
HERBERT SWIEDLER.

Copies of this patent may be obtained for five cents each, by addressing the "Commissioner of Patents, Washington, D. C."